Sept. 27, 1966 N. R. HALL ETAL 3,275,755

MAGNETIC REPERTORY DIALER WITH PULSE RECONSTITUTOR

Filed Nov. 5, 1963 7 Sheets-Sheet 1

INVENTORS: N. R. HALL
J. H. HAM, JR.
W. E. HOSTETLER
K. O. HUTCHINSON
L. A. STROMMEN

BY: E. J. Olinder
ATTORNEY

MAGNETIC REPERTORY DIALER WITH PULSE RECONSTITUTOR

Sept. 27, 1966 N. R. HALL ETAL 3,275,755

MAGNETIC REPERTORY DIALER WITH PULSE RECONSTITUTOR

Filed Nov. 5, 1963 7 Sheets-Sheet 3

Sept. 27, 1966 N. R. HALL ET AL 3,275,755

MAGNETIC REPERTORY DIALER WITH PULSE RECONSTITUTOR

Filed Nov. 5, 1963 7 Sheets-Sheet 5

MAGNETIC REPERTORY DIALER WITH PULSE RECONSTITUTOR

Filed Nov. 5, 1963

United States Patent Office 3,275,755

Patented Sept. 27, 1966

3,275,755

MAGNETIC REPERTORY DIALER WITH PULSE RECONSTITUTOR

Norris R. Hall, James H. Ham, Jr., Willard E. Hostetler, Kenneth O. Hutchinson, and Lawrence A. Strommen, Indianapolis, Ind., assignors to Bell Telephone Laboratories, Incorporated, New York, N.Y., a corporation of New York Filed Nov. 5, 1963, Ser. No. 321,617
14 Claims. (Cl. 179—90)

This invention relates to pulse reconstituting systems and, more particularly, to such systems as employed in the environment of repertory dialer telephone sets.

Repertory dialers, which are well known in the telephone art, typically employ a storage means such as a magnetic drum or the like, to enable the subscriber to store the directory numbers of frequently called parties. Means are also provided which permit the subscriber to dial out a selected one of the stored directory numbers by the simple manual actuation of a single button or similar control device.

To enhance the fidelity of pulses applied to the telephone line from the storage medium of a repertory dialer, it is common practice to employ some means of pulse reconstitution or regeneration in order to avoid pulse deformation, changes in pulse duty cycle, changes in pulse repetition rate and other pulse errors which are unavoidably introduced in the course of the recording, storing, and reading out processes. Heretofore, the means employed in repertory dialers for reconstituting stored pulses have not been fully satisfactory. Some systems fail to achieve the desired level of pulse accuracy. Others are unduly complex, costly to manufacture, difficult to maintain and, consequently, limited in commercial appeal.

One common method employed in pulse reconstitution is the so-called pulse-by-pulse system wherein each pulse read out from the storage medium is employed directly to trigger the generation of a corresponding output pulse. In mechanical systems of this type the repetitive cycling required for the generation of each pulse is necessarily accompanied by a certain amount of mechanical backlash through the gearing and the attendant wear on the system is conducive to the very distortion in pulse output that the system seeks to avoid.

Other known pulse-by-pulse systems employ electronic means, such as monostable multivibrators, for example, in lieu of mechanical reconstituters. The use of an electronic pulse reconstituter, however, results in a substantial increase in cost—an increase stemming not only from the basic circuit components employed but also from the cost of the components in the temperature compensating networks that are typically required.

Still other systems in the prior art seek to avoid the disadvantages of pulse-by-pulse reconstitution by the utilization of the so-called "envelope" system in which dial pulses are employed to initiate the generation of a continuous wave signal corresponding, in duration, to all of the dial pulses indicative of a dialed digit. The continuous wave signal, or oscillatory burst, rather than the direct output of the dial pulsing contacts, is then recorded in the storage medium. In such a system the reconstituter is essentially free-running and in contrast to the repeated cycling of the pulse-by-pulse type of reconstituter, only the inception and termination of the recorded continuous wave signal are employed to start and stop, respectively, the generation of output pulses. The advantages offered by "envelope" systems, however, are attained only at the cost of a substantial increase in circuit complexity.

In view of the problems encountered in the prior art as outlined above, one object of the invention is to simplify telephone repertory dialing equipment.

Another object of the invention is to increase the fidelity of pulse reconstitution in repertory dialers without resort to increased equipment cost or complexity.

These and other objects are achieved in accordance with the principles of the invention by the utilization of a pulse reconstituting arrangement which employs simple direct-current pulse recording and read out in combination with a modified free-running pulse reconstituter.

The system is modified in the sense that it is not based on the envelope principle but instead, employs a unique relationship between the pulse repetition rate of pulses fed to the reconstituter and the pulse repetition rate of pulses generated by the reconstituter. More specifically, a reconstituter, in accordance with the principles of the invention, receives individual pulses from the storage medium at a rate which slightly exceeds the rate of the pulses generated by the reconstituter. So long as the pulse repetition rate of the pulses received from the storage medium falls within a preselected range, the reconstituter is entirely free-running and its operation is unaffected by the pulses falling between the first pulse and the final pulse of a pulse group corresponding to a single digit.

Another aspect of the invention involves a means for protecting a repertory dialer against inadvertent operation of the stored number selecting means during operation either in the automatic CALL or RECORD cycle without resort to locking means. Specifically, manual means which may be in the form of an operating knob, for example, are provided to perform the dual function of positioning the combination RECORD-REPRODUCE head in juxtaposition to a selected one of the peripheral tracks on the storage drum, and of indicating visually the identity of the party corresponding to the selected track. In accordance with the invention, placing the machine either in the CALL or in the RECORD condition physically disassociates the manually operated indexing and channel selecting means from the RECORD-REPRODUCE head. As a result, the possibility of shifting from one track to another during the CALL cycle or during the RECORD cycle is avoided without resort to the employment of locking means and the attendant danger that such means may be forced and broken by an uninformed operator.

Another aspect of the invention deals with the difference in control means employed to advance the position of the storage medium during the RECORD cycle as compared to the advancing means employed during the CALL cycle. Specifically, each pulse generated by the subscriber-operated dial operates a stepping mechanism which drives the recording medium through a fixed distance or step. As a result, the accuracy of the pulse rate and duty cycle as recorded is not controlled by the dialing means but instead depends on the precise movement of a storage medium stepping mechanism and an internal timing circuit. In the CALL condition the storage medium is advanced steadily at a precise, even rate as opposed to the stepping advance employed in the RECORD condition. In accordance with the invention, the speed of advance of the storage medium in the RECORD condition exceeds the speed of advance in the CALL condition. This speed difference permits interdigital time, which may be on the order of .6 or .7 second, for example, to be read into the storage medium in a period of time on the order of 350 to 400 milliseconds. Additionally, the slightly higher rate of advance of the storage medium during read-in compensates for any excessive rate of pulse generation which may occur when a subscriber forces the pulsing dial against the controlling governor.

Accordingly, one feature of the invention pertains to a repertory dialer employing direct-current pulse recording and a free-running pulse reconstituter.

Another feature relates to a repertory dialer employing a pulse read out rate which is exceeded by the pulse storage rate and a pulse reconstituter rate which is exceeded by the rate of pulse read out.

A further feature concerns the automatic physical disconnecting of the number selecting means from the RECORD-REPRODUCE head in a repertory dialer in response to a shift of the operating mode to the CALL or to the RECORD cycle without resort to locking means.

The principles of the invention, together with additional objects and features thereof, will be fully apprehended by reference to the following detailed description of an illustrative embodiment and to the appended drawing in which.

Figure 3A:
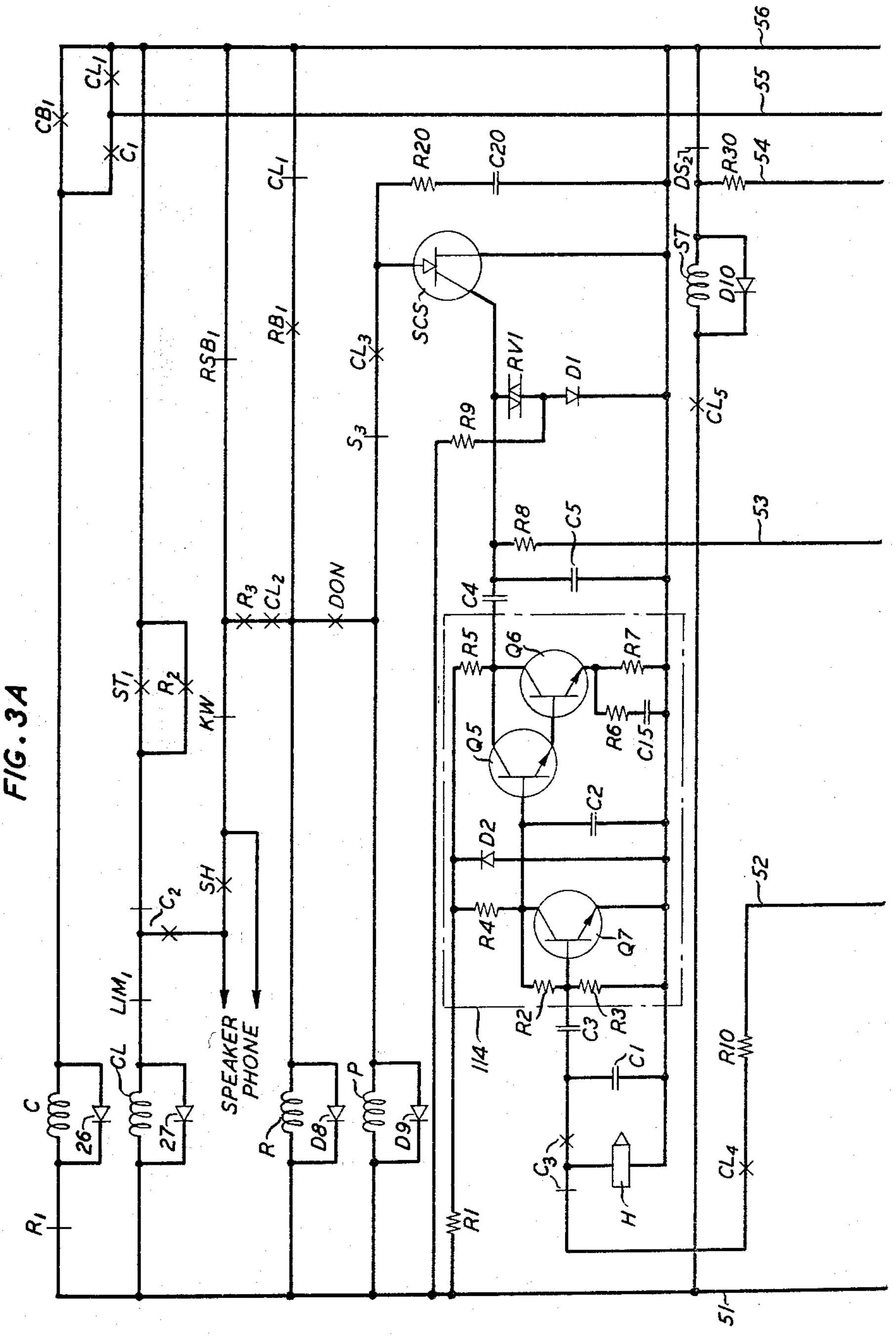
Figure 5:
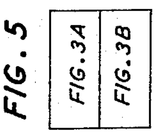
Figure 3B:
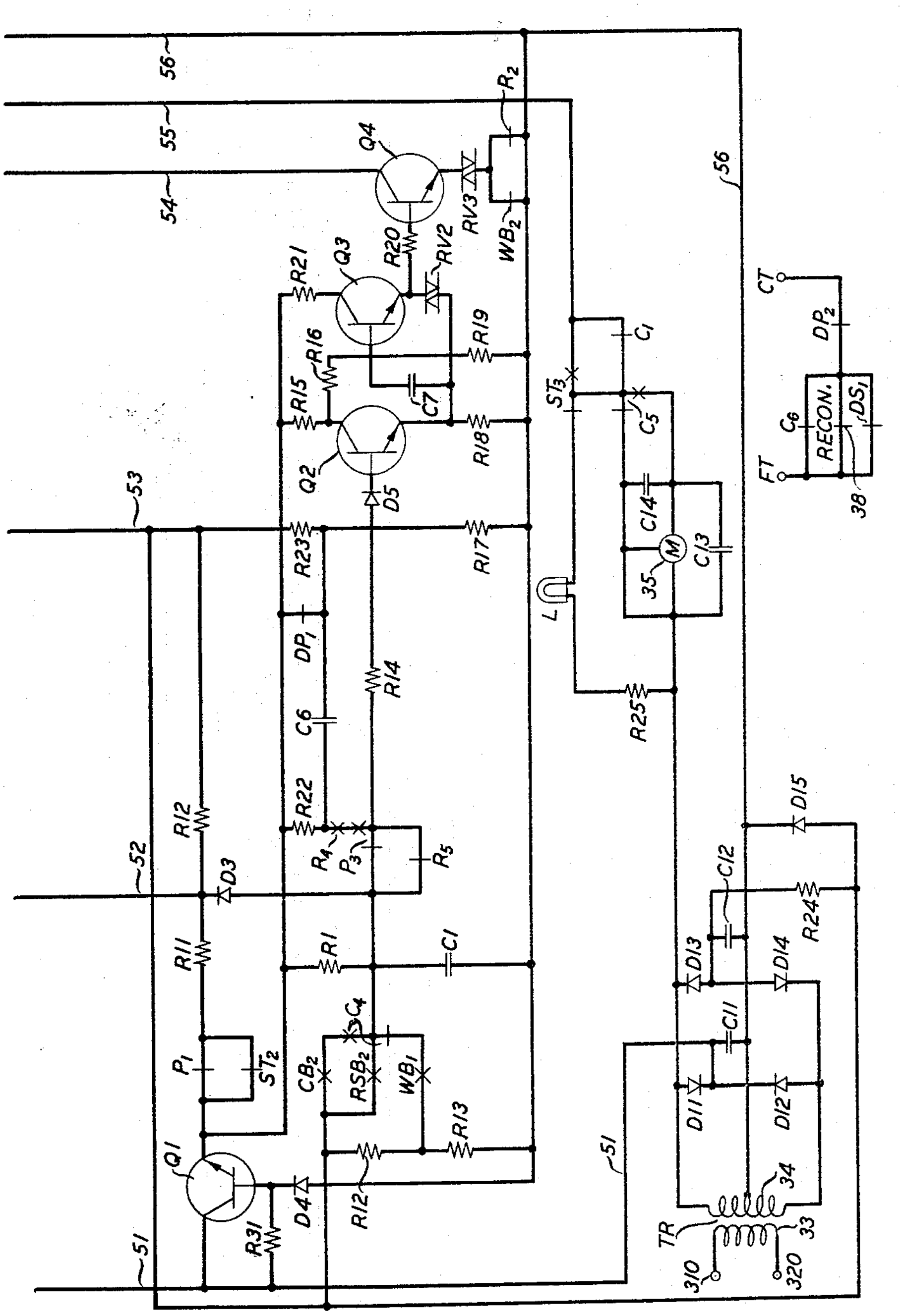
Figure 4A:
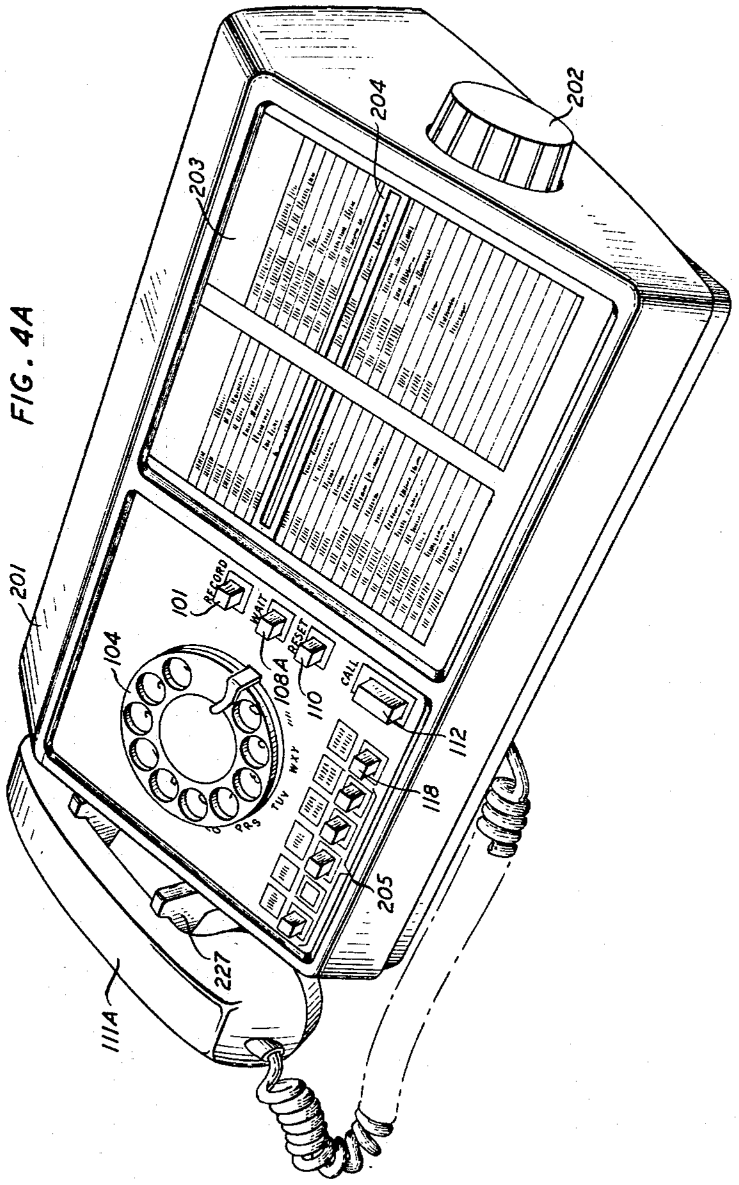
Figure 4B:
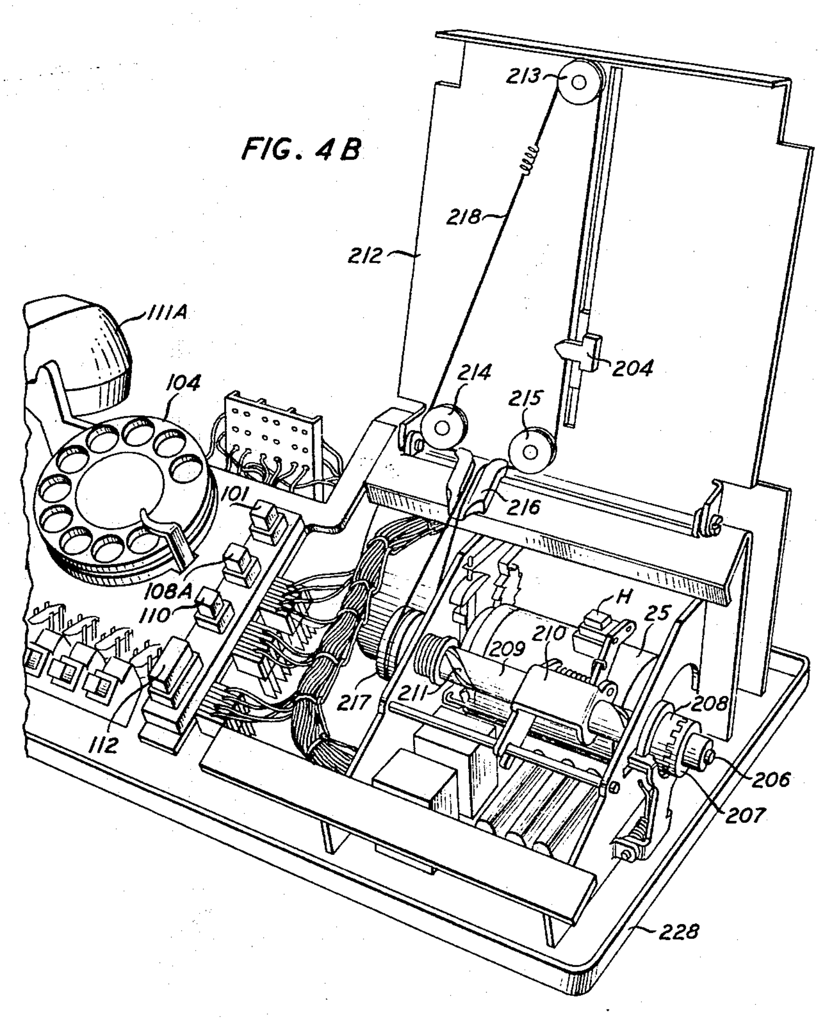
Figure 4C:
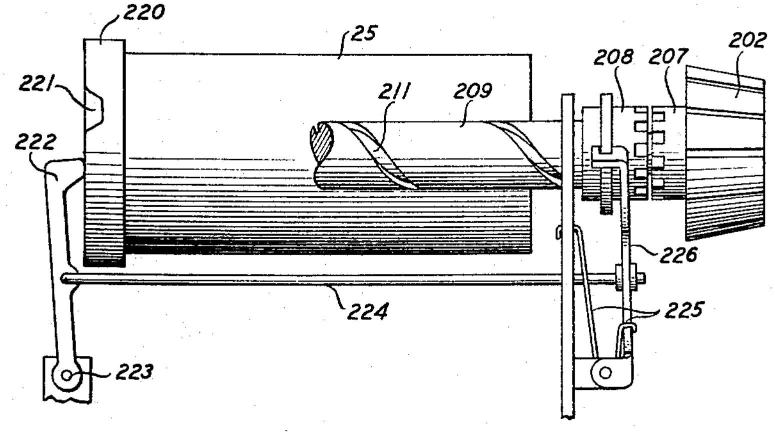
Figure 6:
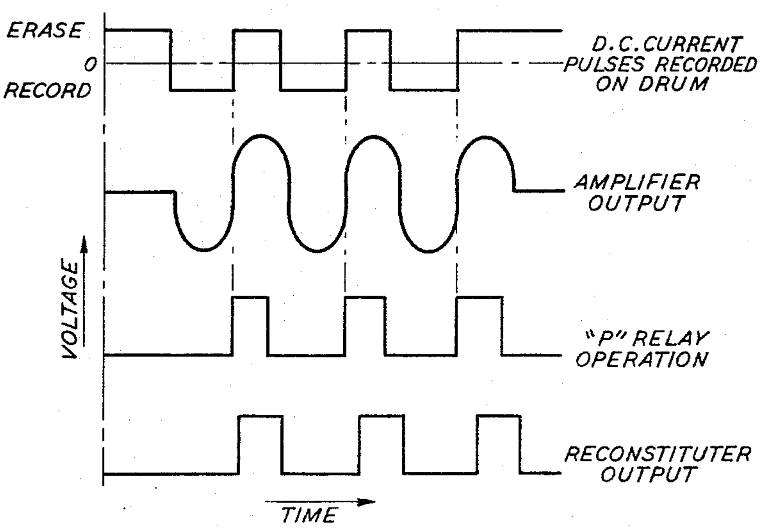
Figure 7:
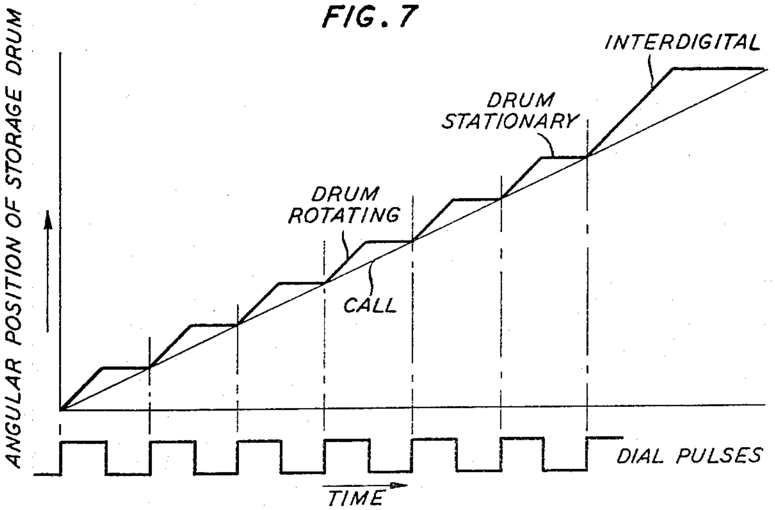

FIG. 3A and FIG. 3B together present a complete schematic circuit diagram of a repertory dialer in accordance with the invention;

FIG. 4A is a sketch of the outside structure of a repertory dialer embodying the principles of the invention;

FIG. 4B is a partial internal view of the repertory dialer shown in FIG. 4A;

FIG. 4C is an enlarged view of a part of the interior mechanism shown in FIG. 4B;

FIG. 5 is a block diagram showing the relation between FIG. 3A and FIG. 3B;

FIG. 6 is a plot of pulse wave forms occurring at various key stages in a repertory dialer in accordance with the invention; and FIG. 7 is a plot of the angular position of the storage drum with respect to time.

*The repertory dialer as an integral telephone unit—General*

The various mechanical structures and electrical circuitry embodying the features of the invention may be housed as an integral unit as shown in FIG. 4A. The unit is enclosed by an outside casing member 201 and mounts a conventional switchhook cradle 227 carrying a handset 111A. Suitable apertures are provided in casing 201 to accommodate dial 104 and the various operating buttons. The lower row of buttons 205 are those normally associated with a six-button key telephone set. Operating buttons controlling the functions of the repertory dialer include RECORD button 101, WAIT button 108A, RESET button 110 and CALL button 112. The particular function of each of these buttons is discussed below in connection with the detailed description of operation.

A removable two-column name and directory number display card 203 is provided to enable a subscriber to record up to fifty names and associated directory numbers. A number to be called is selected by positioning an indicator bar 204 by means of selector control knob 202. The operation of these elements may be seen more readily in FIG. 4B. In FIG. 4B a pivotally mounted plate 212 which provides a support for directory number display card 203 has been raised upwardly to disclose the arrangement of certain key elements of the dialer. When setting up a particular number to be called, knob 202 (FIG. 4A) is turned which rotates shaft 209 through clutch members 207 and 208. RECORD-REPRODUCE head H is moved axially along drum 25 as the head mounting member 210 is engaged by the spiral groove 211 of shaft 209. The turning of shaft 209 turns drive wheel 217. An endless cord member 218, driven by wheel 217, and further held in place by guide wheels 213, 214, 215 and 217, and by guide slot 216, drives indicator bar 204 to the desired directory number at which point RECORD-REPRODUCE head H is positioned over that circumferential recording track on drum 25 where the corresponding directory number is recorded.

In accordance with a particular feature of the invention, selector knob 202 is permitted to spin independently from shaft 209 whenever a number is being recorded on drum 25 or whenever a number is being automatically dialed out from drum 25. As shown in greater detail in FIG. 4C, one end of drum 25 carries a hub member 220 with a camming notch 221. In a manner described in more detail hereinbelow, drum 25 is automatically rotated away from an INDEX position whenever a number is to be recorded or whenever a number is to be automatically dialed out. In the INDEX position the head of crank 222 rests in camming groove 221. When the drum rotates OFF–INDEX, however, crank 222 is pivoted on an axis 223, since it encounters the raised portion of hub 220. Consequently, rod 224 engages lever 226, normally spring-loaded by spring 225, and disengages clutch member 208 from clutch member 207. Clutch member 208 is keyed to shaft 209 and with the disengagement of clutch member 207, selector knob 202 is permitted to rotate independently from shaft 209. It is this feature of the invention that gives positive assurance that neither the automatic dialing out of a number nor the recording of a number may inadvertently be interrupted by the operation of knob 202.

*General functional description—RECORD mode*

Figure 1:
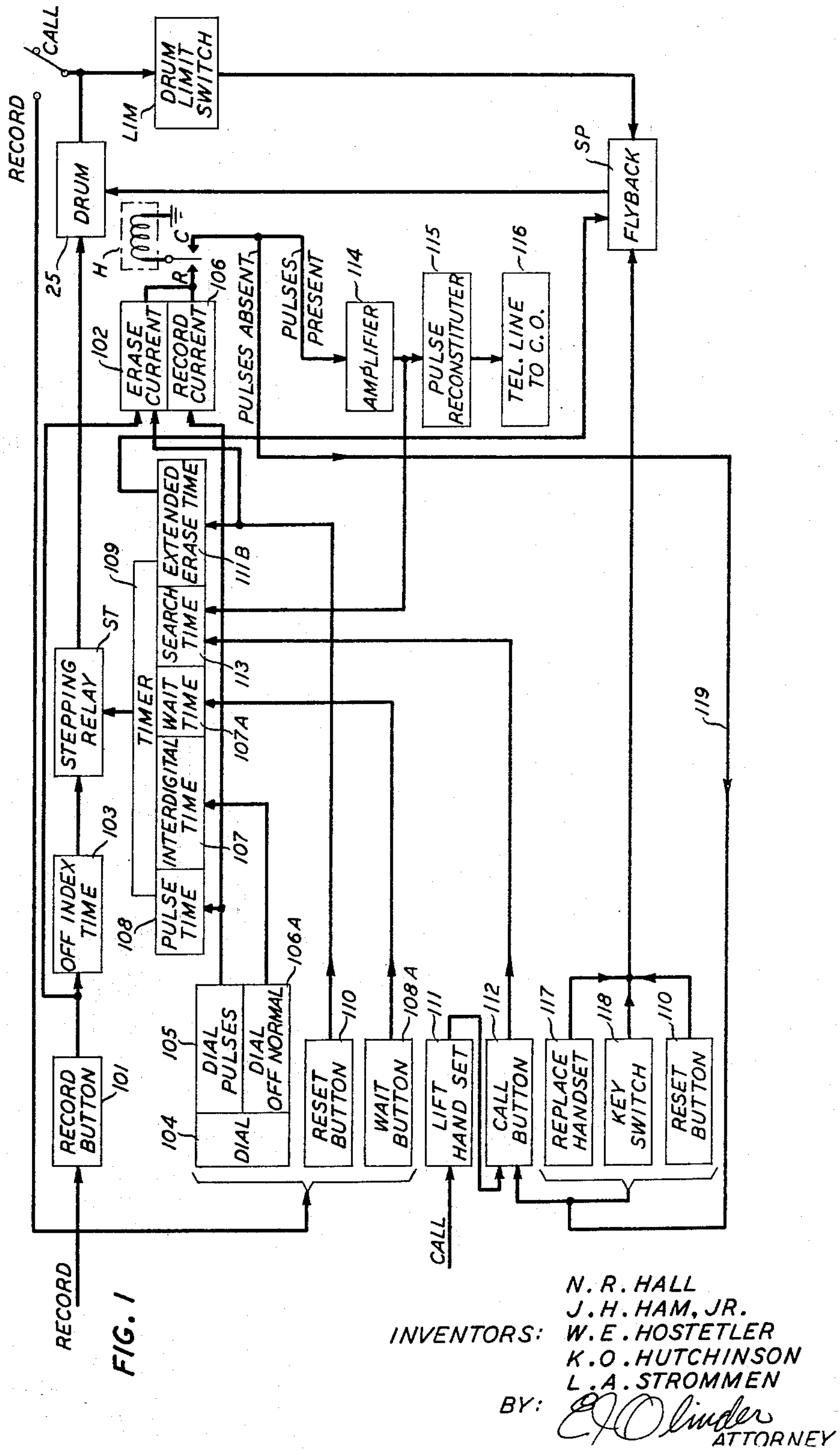
FIG. 1 is a functional block diagram of a repertory dialer in accordance with the invention.

A general discussion of an illustrative embodiment of the invention from the standpoint of function may be presented with reference to the functional block diagram shown in FIG. 1. The functions involved may be traced most readily by considering sequentially the operations that occur during the RECORD cycle. The RECORD cycle is started by operating RECORD button 101 which introduces ERASE current 102 to recording head H and also introduces OFF-INDEX time 103 to stepping relay ST in order to move drum 25 from its INDEX position to its OFF-INDEX position. At this point, the machine is ready to receive information in the form of dial pulses.

The generation of dial pulses 105 by dial 104 effects the transmission of RECORD current 106 to recording head H. The movement of dial 104 to a dial OFF-NORMAL position 106A provides for the introduction of interdigital time 107 at the completion of the dialed digit. Each pulse 105 operates stepping relay ST through pulse time 108 to permit drum 25 to rotate through a preselected angular increment. If the customer wishes to introduce WAIT time 107A into timer 109 to control stepping relay ST, WAIT button 108A is operated. The introduction of WAIT time 107A into timer 109 holds stepping relay ST operated for a preselected time less than the search time 113, permitting drum 25 to rotate for that period. WAIT time is employed whenever the nature of the call requires the dialing of an access number and the receipt of a second dial tone before dialing out the remainder of the number.

At the completion of the dialing-in process, the subscriber operates RESET button 110 which introduces extended ERASE time 111B to stepping relay ST to rotate drum 25 and at the same time applies ERASE current 102 to RECORD-REPRODUCE head H in order to erase any information remaining on the drum. ERASE current is applied over a section of recording track sufficiently long to permit the dialer, when in the CALL condition, to stop prior to the receipt of any false pulses. Drum limit switch LIM is provided to place drum 25 under direct control of a fly-back spring SP in the event that the drum travels to a preselected fly-back position. Spring SP moves drum 25 back to its INDEX position.

*General functional description—CALL mode*

To place the machine in the CALL condition, the subscriber first lifts handset 111 and depresses CALL button 112 which introduces SEARCH time 113 into timer 109 to operate stepping relay ST for a preselected period, permitting drum 25 to rotate through a search arc of preselected duration. If recorded pulses are encountered on the drum track corresponding to the position of RECORD-REPRODUCE head H, these pulses are read off by head H from drum 25 and applied to the input of amplifier 114. The output of amplifier 114 operates pulse reconstituter 115 and the pulses developed thereby are applied to telephone line 116.

If no pulses are detected on drum 25 for a preselected period of time, the machine stops and the subscriber must take one of the actions indicated at the termination of the "pulses absent" path 119, i.e., operate CALL button 112, operate RESET button 110, replace handset 117 or select a new line through operation of key switch 118. If the subscriber is waiting for a second dial tone, the proper action is to operate CALL button 112 reintroducing SEARCH time 113 thereby causing timer 109 to operate stepping relay ST, permitting drum 25 to rotate. When pulses once again are read off from drum 25 by head H, they are applied to amplifier 114 as previously described. When pulses appear again at the output of amplifier 114, indicating the presence of additional pulses on drum 25, SEARCH time 113 is introduced into timer 109 and stepping relay ST remains operated permitting drum 25 to rotate, thereby continuing the search for new pulses.

When the subscriber takes one of the other actions indicated and replaces handset 117, operates key switch 118 or operates RESET button 110, fly-back mechanism SP moves drum 25 to its INDEX position. If, instead, the subscriber operates CALL button 112 again permitting drum 25 to continue its rotation, the drum eventually hits drum limit switch LIM which action also permits fly-back spring SP to drive drum 25 back to its INDEX position.

*Mechanical implementation*

Figure 2:
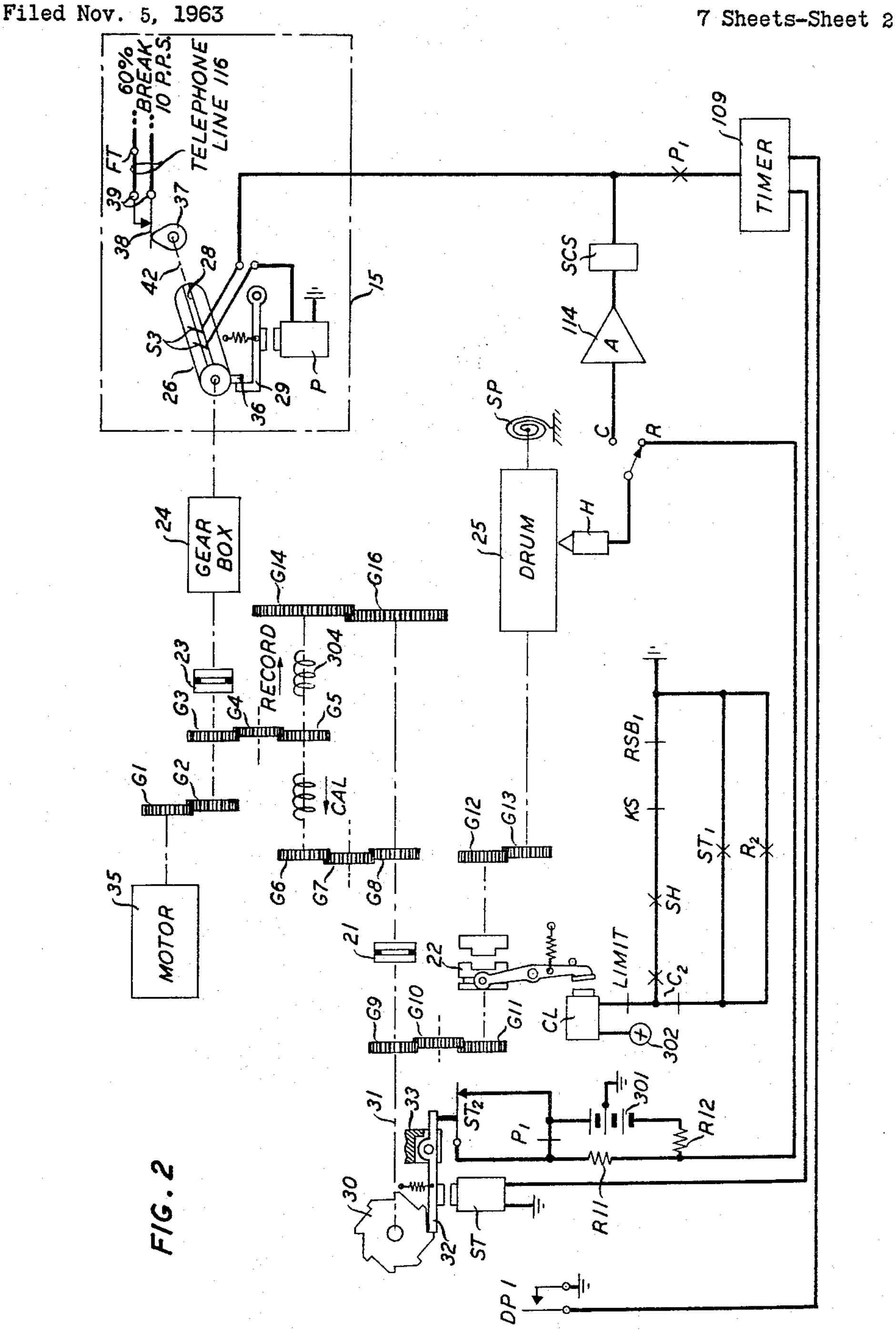
FIG. 2 is a partial mechanical and circuit schematic diagram of the pulse system of a repertory dialer in accordance with the invention.

The foregoing description is directed to the operation of an illustrative embodiment of applicants' invention viewed primarily from the standpoint of the interrelation of functions. A general understanding of the type of mechanisms that may be employed to implement the functions described above will be gained from a consideration of the partial mechanical schematic diagram of applicants' repertory dialer shown in FIG. 2. FIG. 2 also shows certain skeletonized electrical control circuitry to enhance the clarity of the mechanical schematic diagram. Key elements shown in FIG. 2 include magnetic drum 25 and drive motor 35 together with interconnecting gears G1–G16 and clutches 203, 204, 21 and 22. Also shown are a pulse reconstituter arrangement 115, stepper cam 30 and its associated stepping relay ST and timer 109. A RECORD-REPRODUCE head H is shown in juxtaposition to drum 25. Head H may be moved axially along drum 25, as described above, to position it properly with respect to any one of a plurality of peripheral, axially spaced recording tracks. Drum 25 is rotated by motor 35, under the control of relay CL, which controls fly-back clutch 22, and relay ST which controls the action of stepper cam 30. Motor 35 is a synchronous speed reversible motor. With motor 35 turning in a first direction, which corresponds to the CALL mode of operation, mechanical drive is transmitted by way of gears G1 through G5, direction sensing clutch 303 and gears G6 through G8 to slip clutch 21. Unless stepper cam 30 is released by the action of armature 32 of relay ST, which armature acts as a holding pawl, the transmission of mechanical power from motor 35 stops at slip clutch 21 and drum 25 is not rotated. If stepper cam 30 is released, however, mechanical transmission continues by way of clutch 21 and gears G9 through G11 and, if fly-back clutch 22 is engaged, thence by way of gears G12 and G13 to drum 25.

A part of the electrical circuitry controlling relay CL is shown to indicate the various relays and contacts that are interdependently related to provide for various operating conditions. These control contacts include break contact $LIM_1$ of the drum limit switch LIM shown in FIG. 1, make and break contacts $C_2$ associated with a C relay shown in FIG. 3A, make contact $ST_2$, associated with relay ST shown in FIG. 3A, a make contact $R_2$ associated with the R relay shown in FIG. 3A, a break contact KS associated with key switch 118, shown in FIG. 4A, and a break contact $RSB_1$ of RESET button 110, shown in FIG. 4A. Operating current to relay CL is supplied by power supply 202, ground being extended by way of one of the three parallel paths indicated. The particular operating path employed is of course dependent upon the condition of the contacts described.

In the CALL mode, power from motor 35, transmitted through the mechanical drive path described above, turns drum 25 at a fixed speed corresponding to a preselected pulse rate which may be on the order of 10.3 pulses per second. In the RECORD mode, however, with mechanical drive transmitted through gears G3, G4, and G5, direction-sensing clutch 304 and gears G14 and G16, drum speed is increased to a rate of rotation which corresponds to a pulsing rate which exceeds the CALL pulsing rate. The RECORD pulsing rate may be, for example, on the order of 15.4 pulses per second.

Relay ST, which, as described above, controls the stepping of drum 25 through the operation of stepper cam 30, is in turn controlled through timer 109. Inputs to timer 109 which result in outputs for the operation of relay ST include pulses from dial pulse contacts $DP_1$, when in the RECORD mode, and, when in the CALL mode, pulses read out from drum 25 and applied by way of amplifier 114, silicon control switch SCS and make contact $P_1$ of the P relay.

The application of RECORD or ERASE current to head H from battery 301 is controlled by break contacts $ST_2$ and $P_1$. With relay ST operated, negative RECORD current is supplied by way of resistor R12 and with either relay ST or P unoperated, a path for ERASE current is provided by way of contact $ST_2$ and resistor R11 or by way of contact $P_1$ and resistor R11.

Silicon control switch SCS, which may be any one of a number of suitable commercial types such as GE3N58 is used to convert the sinusoidal output of amplifier 114 into abrupt current pulses to ensure accurate timing and control of relay P. Pulse reconstituter 115, which in effect regenerates the pulses read out from drum 25, includes relay P, its armature 29, a commutator 26 having a conducting portion 28 thereon, an arresting pin 36, pulsing cam 37 and pulsing contacts 38. In accordance with the invention, with relay P operated, armature 29 is pulled clear of arresting pin 36, allowing common shaft 42 to drive commutator 26 and pulsing cam 37. Driving power for shaft 42 is supplied from motor 35 by way of gears G1, G2, G3, slip clutch 23 and gear box 24.

The output of amplifier 114 is an approximate sine wave with a frequency on the order of 10 cycles per second, for example, which frequency is established by the speed of rotation of drum 25. As indicated above, the amplifier 114 output is employed to trigger switch SCS into conduction. When switch SCS conducts, relay P is operated and as a result relay P is synchronized with the sine wave output of amplifier 114. It is the operation of relay P that permits the rotation of shaft 42 and hence the operation of reconstituter 115.

In accordance with the invention, reconstituter shaft 42 is designed to operate at a slightly slower rate than the rate at which pulse information is being read out from drum 25 and consequently reconstituter 115 is not synchronized to the operation of relay P insofar as the leading edge of the P relay versus the leading edge of the reconstituter is concerned. The amount of time that the P relay must be held operated is determined by the time required for pin 36 to clear armature 29 on each rotation and accordingly it is possible to synchronize the release of the P relay with the rotation of the reconstituter.

The synchronization indicated is achieved through the operation of switch $S_3$ for it is the operation of this switch that is used to release the P relay. In effect, a combination of information from amplifier 114 and reconstituter 115 is employed to control relay P.

Reconstituter 115 remains in a free-running state so long as an uninterrupted train of pulses is being read out from the drum. Upon the termination of a digit or train of pulses relay P no longer operates, pin 36 is engaged by armature 29 and no further pulses can be generated by the reconstituter until additional pulses are read off drum 25.

*Detailed circuit operation—RECORD mode*

The foregoing discussion of FIGS. 1 and 2 and of FIGS. 4A, 4B and 4C has been directed to the presentation of a broad functional description of a repertory dialer in accordance with the invention and to the description of an illustrative mechanical arrangement which may be employed to implement certain features of the invention.

The schematic circuit diagram shown in FIGS. 3A and 3B is illustrative of the type of control circuitry that may be employed in combination with the mechanical arrangements shown in FIG. 2 and in FIGS. 4A, 4B and 4C to provide a complete repertory dialer in accordance with the invention. Broadly, the control circuit includes transistors Q1, Q2, Q3, and Q4 and their associated circuit components which, in part, provide the necessary timing and logic. The logic requirements are also met, in part, by relays C, CL, R, P, and ST. Each of these relays is illustrated schematically by a coil shunted by a respective one of the diodes D6 through D10. Relay contacts are shown in conventional detached contact notation with an "X" denoting a make contact and a bar "—" denoting a break contact. All contacts are shown in the "operated" condition. Each contact is identified by the designating letter or letters of its respective relay or operating button with the addition of a distinguishing subscript numeral.

Alternating current input power may be applied to the circuit by way of terminals 310 and 320 of primary 33 of transformer TR. The conventional power supply circuit includes diodes D11 through D15, capacitors C11 and C12 and resistor R24.

RECORD-REPRODUCE head H is shown in FIG. 3A although recording drum 25 (FIG. 2) is not shown inasmuch as it is not an integral part of the control circuit. Amplifier 114 comprises transistors Q5, Q6, and Q7 and their associated components.

A complete understanding of the function of each of the circuit components shown in FIGS. 3A and 3B and an understanding of the interrelations of these functions is best gained by following the sequence of operations which occurs in both the RECORD and CALL modes. To initiate the RECORD cycle, make contact $RB_1$, FIG. 3A, of RECORD button 101 (FIG. 4A) is operated to apply power from common power lead 56 to relay R by way of break contact $CL_1$. Relay R operates, closing make contact $R_2$. An operating path is thus completed for relay CL by way of break contact $LIM_1$ of drum limit switch LIM (FIG. 1), normally closed break contact $C_2$ and operated make contact $R_2$. With relay CL operated, a make contact $CL_2$ closes. Relay R is locked up through a path which includes make contact $CL_2$, make contact $R_3$ and a break contact $RSB_1$ of the RESET button 110 (FIG. 4A) which is normally closed. With relay R locked up through the path indicated, relay CL is also held up. With relay CL operated, make contact $CL_5$ is operated, thereby completing an operating path for relay ST through drum switch break contact $DS_2$. With relay ST operated, drum 25 (FIG. 2) starts its rotation, as described above, in connection with the discussion of FIG. 2.

Drum 25 rotates until an OFF-INDEX position is reached, at which point drum switch break contact $DS_2$ is opened. As a result, the operating path for relay ST is opened and relay ST releases, stopping the rotation of the drum. As described above, relay ST is the stepping relay which controls stepper cam 30 (FIG. 2). When relay ST is in the unoperated condition, stepper cam 30 is held in place and is not free to rotate. Under these conditions, the recording drum 25 cannot rotate. Whenever relay ST is operated, however, stepper cam 30 is released and drum 25 rotates. At this point, with drum 25 rotated OFF-INDEX, the system is conditioned to receive and record dial pulse information.

When the subscriber rotates the dial OFF-NORMAL, dial OFF-NORMAL make contacts DON close, completing an operating path for relay P through make contact $CL_2$, make contact $R_3$ and break contact $RSB_1$. With relay P operated, break contact $P_1$ in the emitter circuit of transistor Q1 in FIG. 3B is opened. At this point, current flow to the timer circuit is not affected. When dial pulse contact $DP_1$, FIG. 3B, first opens, the resulting signal on the base of transistor Q2 turns transistor Q2 OFF. With transistor Q2 OFF, transistor Q3 and then transistor Q4 turn ON. Current flow by way of lead 54 and resistor R30 in the collector circuit of transistor Q4 operates relay ST. With relay ST operated, break contact $ST_2$ opens, removing the positive ERASE current from recording head H. At this point only negative current flows in recording head H and it is this current that is used to record the pulse information on magnetic drum 25.

Upon the generation of the first dial pulse, recording current is allowed to flow briefly for a period which may be on the order of 30 milliseconds, for example. At the termination of the first pulse, relay ST is released, break contact $ST_2$ closes and the current to head H returns to the ERASE condition for the remainder of drum travel. By operating relay ST only during the period of the pulse as modified by the timing circuit, the recording drum is permitted to rotate through one step, the equivalent of one pulse length or 0.1 second when the machine is in the read out or CALL condition. In the RECORD condition, however, the corresponding time may be on the order of 65 milliseconds because of the difference in speed at which drum 25 is driven in the CALL and RECORD modes. A plot of drum angular position with respect to time in both the CALL and RECORD modes is shown in FIG. 7. On each subsequent dial pulse generated by dial pulse contact $DP_1$ another 30 millisecond current pulse is applied to relay ST and the cycle described immediately above is repeated. This cycle continues to repeat itself for each pulse of each dialed digit. Upon the return of the dial to its rest position, make contacts DON open, releasing relay P.

When relay P operates in the manner described above, transfer contacts $P_3$ operate which permits the timing circuit to be energized only via dial pulse break contact $DP_1$. With relay P released, however, transfer contacts $P_3$ are transferred back to normal and an interdigital time is established by the time constant associated with the combination of resistor R1 and capacitor C1. The interdigital time thus established is introduced in the following manner: When break contact $P_1$ and break contact $ST_2$ are both open, a charge is supplied to capacitor C1. This charge is negative. When transfer contacts $P_3$ are returned to their normal or unoperated condition at the time when dial 104 (FIG. 4A) returns to normal, the negative charge on capacitor C1 maintains transistor Q2 in its OFF state. Relay ST is held operated over an operating path which includes the collector-emitter path of transistor Q4 which is in the ON condition whenever transistor Q2 is OFF. Relay ST remains operated until the charge on capacitor C1 changes to a level which turns transistor Q2 ON.

With positive potential on its base, transistor Q2 is turned ON thereby turning transistor Q3 OFF which is followed by the turning OFF of transistor Q4, opening the operating path for relay ST. Consequently, relay ST releases.

When all of the digits of a directory number have been recorded, the subscriber operates RESET button 110 (FIG. 4A) which operates break contact $RSB_1$, opening the operating path of relay R. Approximately 1.5 seconds of read out time is introduced into the timer circuit by way of operated make contact $RSB_2$. The introduction of the 1.5 seconds of read out time into the timer circuit results in the operation of relay ST for 1.5 seconds. With relay ST operated, make contact $ST_1$ is closed and upon the release of relay R, make contact $R_2$ opens. Relay CL is held up through normally closed limit switch contact $LIM_1$, normally closed break contact $C_2$ and make contact $ST_1$ to common power supply lead 56. At the end of the 1.5 second interval, relay ST releases. Contact $ST_1$ opens, opening the holding path for relay CL. With relay CL released, clutch 22 (FIG. 2) is disengaged and the unit is placed in a nonrecording condition. With clutch 22 released, fly-back spring SP forces drum 25 back to its home position. Should a subscriber attempt to record more information than is permitted by the capacity of the drum, limit switch break contact $LIM_1$ will open. As previously described, limit switch break contact $LIM_1$ is in series with relay CL and accordingly upon the operation of break contact $LIM_1$, relay CL releases, make contact $CL_2$ opens, relay R releases and drum 25 flies back to its home position.

To clarify further the relation between the rotation of drum 25, the operation of motor 35 and the operation of relay ST, it should be noted that in the RECORD condition whenever relay CL is operated, motor 35 is running inasmuch as make contact $CL_1$ is in the power supply path for motor 35. In the RECORD mode relay CL remains operated at all times and accordingly motor 35 is operated continuously.

A RECORD light L is provided which lights whenever drum 25 is in the STOP position so long as the dial is not rotated OFF-NORMAL. If the subscriber has rotated the dial OFF-NORMAL, relay ST operates, as described above, opening up break contact $ST_3$ in the lighting circuit, causing light L to turn OFF. Additionally, if interdigital time is being fed in by the operation of relay ST, transfer contacts $ST_3$ operate, removing power from light L.

For proper operation of the equipment, it is desirable for the subscriber to wait briefly after dialing in each digit until the RECORD light L turns ON. The waiting period is on the order of 0.4 second. In the absence of such a waiting period, interdigital time may be foreshortened and the accuracy of recording and pulse reconstitution correspondingly reduced.

One feature of the invention provides a means for preventing a subscriber from introducing a WAIT period of undue length. As previously described, a subscriber is required to depress a WAIT button 108A (FIG. 4A) in order to introduce a WAIT-FOR-SECOND-DIAL-TONE period in the recording of a number. When WAIT button 108A is released, approximately 1.1 seconds of equivalent CALL time is introduced into the timer, operating relay ST. To prevent the WAIT-FOR-SECOND-DIAL-TONE time from being increased by a subscriber holding down on the WAIT button for an extended period of time, break contact $WB_2$ is provided. With both break contacts $WB_2$ and $R_2$ open, relay ST cannot operate. Accordingly, no matter how long a subscriber may hold down on the WAIT button, only a preselected duration of WAIT time is introduced to relay ST upon the release of the WAIT button.

*Simultaneous recording and dialing out*

The foregoing description is directed solely to the operations involved in the recording of a directory number. The features of the invention, however, provide the option of recording as described or a combination of simultaneous recording and direct dialing out onto the line. In the recording conditions described thus far, the telephone switchhook contacts SH are in the normal condition with handset 111A in its switchhook cradle 227. A second pair of dial pulse contacts $DP_2$ (FIG. 3B) is provided for the subscriber who wishes to place a call and also record the directory number corresponding to that call while he is dialing out. As described above, contacts $DP_1$ act as timer contacts, operating relay ST for a period of approximately 30 milliseconds. The opening and closing of contacts $DP_2$ effect the application of dial pulses directly onto the telephone line through associated telephone set terminals FT and CT.

In the RECORD condition, irrespective of whether a directory number is being dialed out onto the line or only recorded on the drum, pulsing contacts 38 of reconstituter 115 are by-passed by break contact $C_6$, which prevents any interruption or interference by reconstituter pulses which might inadvertently be generated.

*Detailed circuit operation—CALL mode*

To initiate the CALL mode a subscriber first removes handset 111A (FIG. 4A) from its cradle 227, thus closing switchhook contact SH. CALL button 112 (FIG. 4A) is depressed, closing associated contacts $CB_1$, FIG. 3A, which completes an operating path for delay C. If contact $CB_1$ is operated by the depression of CALL button 112 while the set is in the RECORD mode, break contact $R_1$ prevents relay C from operating. With the operation of relay C, transfer contacts $C_2$ operate, completing an operating path for relay CL through limit switch contacts $LIM_1$, make contact $C_2$, switchhook contact SH, the normally closed key switch contact KS and the normally closed RESET button contact $RSB_1$. With relays C and CL operated, relay C is locked up over make contacts $CL_1$ and $C_1$. With the operation of transfer contacts $C_5$, the leads to motor 35 are in effect reversed, causing the motor to drive in a direction opposite to that employed during the RECORD mode. The operation of break contact $C_1$ permits motor 35 to run only during the time that relay ST is operated. During the CALL mode of operation the operating path for motor 35 includes make contact $ST_3$. In the CALL condition there is no need to have motor 35 run continuously, however, and accordingly it is run, as indicated above, only when relay ST is operated. A time function is introduced to the timer circuit by way of a second CALL button contact $CB_2$. The introduction of this time function as wel as drum switch break contact $DS_2$ hold up relay ST. Contact $DS_2$ holds up relay ST until drum 25 is rotated or moved OFF-INDEX. The time introduced by the operation of CALL button make contact $CB_2$ must exceed the time interval required for reception of the first pulse. This latter time may be on the order of 1.1 to 1.2 seconds, for example, and the interval introduced by the operation of contact $CB_2$ may be on the order of 1.5 seconds. The relatively extended time of 1.1 to 1.2 seconds required for the reception of the first pulse stems primarily from the additional time required for motor 25 to build up to full speed.

A pulse read out by recording head H is applied to the base of transistor Q7 by way of make contact $C_3$ and capacitor C3. Additional amplification is provided by the successive amplifier stages which include transistors Q5 and Q6. An illustrative signal level on the collector of transistor Q6 may be on the order of 2 volts peak-to-peak. The signal is applied from the collectors of transistors Q5 and Q6 to the silicon control switch SCS which ensures accurate timing inasmuch as such a device turns on abruptly with each fast rising slope of the sinusoidal type output waves produced by the amplifier. The waveform translation that occurs between the dial pulses as recorded on the drum and the pulses as reconstituted is shown on the plot in FIG. 6.

Switch SCS operated provides an operating path for relay P over normally closed break contact $S_3$ and make contact $CL_3$. Break contact $S_3$ is the commutator switch contact shown in FIG. 2. When relay P operates, it pulls armature 29 clear of pin 36 permitting reconstituter shaft 42 to rotate freely when driven by motor 35. At this point, cam 37 (FIG. 2), also driven by shaft 42, rotates operating pulse contacts 38. Terminals 39 are connected to the outgoing telephone line 116.

The sequence described thus far covers the automatic dialing out of the firts recorded pulses. When break contact $S_3$ reaches its open position, switch SCS returns to a nonconducting state. Switch SCS becomes conducting, as described above, with each successive pulse from amplifier 114. Relay P is readied for operation whenever contact $S_3$ is closed by virtue of its position against conducting segment 28 of reconstituter commutator 26.

Pulses are read off drum 25 at a rate slightly faster than the rate at which reconstituter 115 applies pulses to the line. The rate of read out may be on the order of 10.3 pulses per second while reconstituter shaft 42 is rotating at a rate corresponding to the generation of 10 pulses per second. It is this rate differential which, in accordance with the invention, permits pulse reconstituter 115 to operate as a free-running device. In accordance with the invention, reconstituter 115 has the potential of accepting a determinable period of extra time between the first and second pulses of a digit series without affecting the accuracy of reconstituter pulses. This period may be on the order of 5 milliseconds, for example. Between the second and third pulses, an additional period of 5 milliseconds can be tolerated and with each successive pulse in a pulse train corresponding to a read out digit the timing error that can be tolerated between digits increases by 5 milliseconds. This increase in tolerable error in the time between successive pulses is the direct result of reading out pulses from the drum at a slightly faster rate than the generation rate of corresponding pulses by the reconstituter.

The sequence described above may also be considered from the viewpoint of timer operation. Each time relay P operates, a time interval is introduced into the timing circuit which causes the mechanism to "look for" additional pulses. If a pulse is read out prior to the time that relay ST releases, the timer, which as previously described includes transistors Q2, Q3, Q4 and associated components, is reset to the maximum time interval introduced by relay P. This time interval which is derived from the combination of resistor R1 and capacitor C1 is introduced by the operation of break contact $P_1$ after break contact $ST_2$ is opened. So long as a negative voltage is on that terminal of capacitor C1 which is common with resistor R1, transistor Q2 is held in the OFF condition, thus permitting transistors Q3 and Q4 to be turned ON, which, as described above in the discussion of the RECORD mode, provides a holding path for relay ST. If the potential on the common terminal between capacitor C1 and resistor R1 shifts from negative to positive, transistor Q2 turns ON, turning OFF transistors Q3 and Q4 and releasing relay ST. At this point the dialer is in a WAIT condition and motor 35 turns OFF. Such a WAIT condition will occur if the recording has made provision for the receipt of a second dial tone at this time or it can occur after the final digit of a serial has been dialed out.

Any one of a number of actions may be taken by the subscriber to shift the instrument out of the WAIT condition. For example, a subscriber may select a new line at any time that the set is in the CALL condition and have the dialer reset to its normal state by the operation of a line key switch. A key switch of this type is well known in the art and is typically common to all of the buttons on a six-button key set. Key switch break contacts KS momentarily open the holding path for relay CL and relay CL releases. The opening of makes contact $CL_1$ opens the operating path for relay C and relay C returns to the unoperated condition. The release of relay CL opens make contact $CL_5$, preventing relay ST from operating. Relay CL in releasing permits clutch 22 (FIG. 2) to open and fly-back spring SP drives drum 25 back to the INDEX position.

If, instead of connecting to a new line, the subscriber replaces the handset in its cradle, switchhook contact SH, which is in series with key switch contact KS, opens and the operating sequence described immediately above is followed. If the subscriber operates RESET button 110 (FIG. 4A), the associated break contact $RSB_1$ opens and once again the sequence described above is followed. If the subscriber operates RESET button 110 when in the CALL mode, the set functions in a slightly different manner than when operating the RESET button in the RECORD mode. In the CALL mode the operation of RESET button 110 releases relay CL immediately and permits the entire unit to reset to an INDEX position without delay. In contrast, as described above in the RECORD condition, the operation of RESET button 110 introduces 1.5 seconds of ERASE time into the timing circuit holding relay ST operated.

In the CALL mode break contact $C_6$ which shunts reconstituter contact 38, is in the operated or OPEN condition, permitting reconstituter 115 to generate pulses rather than permitting generation by dial pulse contacts $DP_2$. Drum switch contact $DS_1$, which also shunts reconstituter contact 38, prevents any extraneous pulses from being transmitted when drum 25 is being moved into the OFF-INDEX position immediately after operation of CALL button 112 (FIG. 4A).

Upon occasion it is possible that the operation of one of the various control relays in the set may generate a false pulse which may enter the amplifying circuit, operating switch SCS and relay P which action would introduce a false pulse on the line. Contact $DS_1$ prevents such a condition. By the time the OFF-INDEX position is reached, amplifier 114 and all relays have reached a stable state and the generation of extraneous or false pulses can no longer occur.

*Miscellaneous circuit components*

In the foregoing discussion mention of certain components and relay contacts has been omitted or the discussion of their function has been abbreviated in order to enhance the clarity and continuity of the description of the circuit operation. For completeness, however, it should be mentioned that make contact $CL_3$ is open during magnetic drum fly-back which prevents relay P from operating in response to any pulse that may be applied to turn switch SCS ON.

Varistor RV1 and diode D1 control the bias and provide temperature compensation for switch SCS to the end that switch SCS may be turned on by the application of a relatively low level signal from the amplifier irrespective of temperature variations over a wide range. Resistor R20 and capacitor C20 provide a simple filtering network which prevents the transmission of spurious spike pulses.

The function of transfer contacts $P_3$ and contacts $R_4$ and $R_5$, all associated with the input to the timer, requires some elaboration. In the RECORD condition contact $R_5$ is open and $R_4$ is closed so that transfer contacts $P_3$ have control of whether the timer is controlled by the capacitor C1-resistor R1 timing circuit combination or by dial pulse contacts $DP_1$. When the subscriber has operated the dial, OFF-NORMAL contacts DON close, operating relay P so that at any time when relay P is operated, the timer is in effect "looking for" dial pulses to operate relay ST. It is at the point when transfer contacts $P_3$ operate that contacts $DP_1$ are made available to control the timer. When the dial is restored to its normal state, OFF-NORMAL contacts DON open, relay P is released, dial pulse contacts $DP_1$ are removed from the timer circuit and control of the circuit shifts to the resistor R1-capacitor C1 combination.

Make contact $CL_5$ serves to release relay ST if relay ST is operated at any time when relay CL is released. In the CALL mode relay CL is released through operation of limit switch contacts $LIM_1$, switchhook contacts SH, key switch contacts KS or RESET button contacts $RSB_1$. In the RECORD condition, relay CL is released only upon operation of the limit switch LIM or through the opening of contacts $ST_1$ following an extended ERASE operation.

Make contact $CL_4$ is employed to prevent any current from being applied to head H when the set is in the fly-back condition. During fly-back, relay CL is necessarily in the released condition. The opening of make contact $CL_4$, which occurs upon the release of relay CL, opens the current supply path to head H and accordingly precludes any possibility of erasing information recorded on drum 25.

It is to be understood that the embodiment described herein is merely illustrative of the principles of the invention. A wide variety of arrangements and modifications may be devised by persons skilled in the art without departing from the spirit and scope of the invention.

What is claimed is:

1. Apparatus for the regeneration of electrical pulses comprising, in combination, first means for generating pulses, means for storing said last named pulses, means for extracting said pulses from said storing means at a first pulse repetition rate, second means for generating pulses at a second pulse repetition rate and at a fixed duty cycle, said second rate being slower than said first rate, and means responsive to the first of a group of pulses removed from said storing means by said extracting means for initiating the operation of said second means, said initiating means being further responsive to each succesive pulse in said group of pulses which falls within a preselected range of pulse repetition rates for continuing the operation of said second means on a free running basis irrespective of the relative rate of said group of pulses within said range and irrespective of the duty cycle of the pulses in said group.

2. Apparatus for the regeneration of stored electrical pulses comprising, in combination, means for reading out said stored pulses at a first preselected rate, means for generating pulses at a second preselected rate exceeded by said first rate, means normally holding said generating means inoperative and means responsive successively to each of said pulses derived by said reading out means for successively disabling said holding means thereby to allow said generating means to generate pulses equal in number to pulses derived by said reading out means but unaffected by the form, duty cycle or repetition rate of said pulses derived by said reading out means provided that the duty cycle of said last named pulses falls within preselected limits.

3. Apparatus in accordance with claim 2 wherein said generating means comprises cam-driven pulsing contacts, a rotatable shaft in driving relation to said cam, said holding means normally preventing the rotation of said shaft, said holding means including a relay having an armature, a projection on said shaft engageable by said armature when said relay is in an operated condition, means for applying said derived pulses to said relay thereby to operate said relay, and means operative after a preselected time delay dependent on the number of successive pulses generated by said generating means for returning said relay to an unoperated condition after each operation thereof.

4. Apparatus in accordance with claim 3 wherein said returning means includes a holding path for said relay, said shaft including a surface pattern of conducting and nonconducting areas and means for interrupting said holding path including circuit means having contacts alternately conductively connected and disconnected by said areas as said shaft rotates.

5. A repertory dialer comprising, in combination, manually operated means for generating pulses, means for storing pulses produced by said generating means, means for reading out pulses from said storing means, means for amplifying pulses derived by said reading out means, and means for reconstituting said last named pulses at a first pulse repetition rate, said reconstituting means including cam driven pulsing contacts, means for rotating said cam, a relay normally holding said rotating means from operating, means for applying each pulse from the output of said amplifying means to said relay at a second rate, said second rate exceeding said first rate, thereby to operate said relay and release said rotating means, means operatively dependent on the angular position of rotation of said rotating means for returning said relay to an unoperated condition after each operation thereof by a pulse from said applying means, whereby said reconstituting means generates pulses equal in number to pulses received from said applying means but unaffected by the shape, duty cycle or repetition rate of said last named pulses provided said last named repetition rate falls within a preselected range.

6. A repertory dialer comprising, in combination, magnetic record means, a combination recording-reproducing head positioned in cooperative relation with said record means, motor means for producing relative motion between said record means and said head, manual means for generating dial pulses, means responsive to each of said dial pulses for connecting said motor means to initate relative motion at a first rate through an incremental step between said head and said record means, means for applying electrical current indicative of each of dial pulses to said head thereby to record each of said pulses on said record means as said relative motion in incremental steps occurs between said head and said record means, means for initiating an automatic call cycle, means responsive to said initiating means for connecting said motor means to impart relative motion between said head and said record means through an uninterrupted distance at a second rate exceeding said first rate, said last named distance corresponding to the recorded length of a previously recorded group of pulses, whereby pulses corresponding to said last named group are read out by said head at said second rate, means rotatable by said motor means for reconstituting said pulses read out by said head, means normally holding said rotatable means in a fixed position, said last named means being responsive to the first of said reproduced pulses for releasing said rotatable means, said holding means being further responsive to each successive one of said reproduced pulses in said group after said first pulse for permitting the continued free rotation of said reconstituting means provided that the rate of said successive pulses falls within a preselected range, whereupon said reconstituting means produces a group of pulses at a pulse repetition rate lower than the rate of said pulses read out by said head, the form and duty cycle of said last named group of pulses being independent of the pulses read out by said head.

7. Apparatus in accordance with claim 6 wherein said reconstituting means includes a shaft driven by said motor, said holding means comprising a relay having an armature adapted to engage a projection on said shaft, said relay being normally in the unoperated condition, circuit means including an electrically conducting operating path for said relay, and means responsive to a particular range of angular positions of said shaft for opening said circuit means thereby to place said holding means in a position to arrest the rotation of said shaft when said projection is carried around by said shaft to said armature.

8. Apparatus in accordance with claim 7 wherein said opening means includes a drum member carried by said shaft, the surface of said drum member including a pattern of electrically conducting and nonconducting areas, and said circuit means including spring contacts bearing against said areas.

9. A repertory dialer comprising, in combination, dialing means for generating pulses indicative of a called directory number, a magnetic drum, a combination record-erase head in juxtaposition to said drum, manually rotatable means for shifting the position of said head axially along said drum in incremental steps, each of said steps corresponding to a respective circumferential channel on said drum, means for visually displaying the identity of each party corresponding to the directory number recorded in a respective one of said channels, means responsive to said rotatable means for indicating visually the identity of the particular party corresponding to the channel indicated by the position of said head in relation to the axis of said drum, manually operable means for shifting said dialer from a record mode to a call mode, and means responsive to said last named shifting means for disengaging said rotatable means from said head thereby leaving said rotable means free to rotate with no effect on the position of said head with respect to said drum, thereby eliminating any possible movement of said head during said call mode.

10. Apparatus in accordance with claim 9 wherein said rotatable means includes a carriage supporting said head, a spindle supporting said carriage, said spindle including means for translating rotational movement thereof into lateral movement of said carriage, a manually rotatable knob normally in driving relation to said spindle through clutch means, said clutch means being responsive to said mode shifting means for disengaging said knob from said spindle thereby enabling said knob to rotate free from said spindle and said head.

11. A repertory dialer comprising, in combination, dialing means for generating pulses indicative of a called directory number, a magnetic drum, a combination record-erase head, means responsive to pulses from said dialing means for rotating said drum at a first rate, in incremental steps, thereby to record said pulses on said drum, means for shifting said dialer from a record to a call mode, means responsive to said shifting means for uninterruptedly rotating said drum at a second rate exceeding said first rate whereupon said recorded pulses are applied to said head at a second pulse repetition rate corresponding to said second rate of rotation, pulse reconstituting means responsive to the application of pulses from said head at said second repetition rate for producing corresponding pulses having a preselected form, duty cycle and repetition rate, said second pulse repetition rate exceeding said preselected pulse repetition rate.

12. Apparatus in accordance with claim 11 including common motor means for rotating said drum both during said record and call mode and for driving said reconstituting means.

13. Apparatus in accordance with claim 12 wherein said reconstituting means comprises a shaft rotatable by said motor means, pulsing contacts driven by a cam mounted on said shaft and means normally locking said shaft against rotation by said motor means.

14. Apparatus in accordance with claim 13 wherein said locking means comprises a lug member projecting from said shaft and a pin member normally engaged with said lug member thereby to prevent rotation of said shaft, said disabling means comprising a relay including an armature, said pin being positioned by said armature against said lug or clear of said lug as said relay is in an operated or unoperated condition, respectively, and means including an amplifier for applying pulses derived by said head from said drum to said relay.

No references cited.

KATHLEEN H. CLAFFY, *Primary Examiner.*

J. W. JOHNSON, *Assistant Examiner.*